(12) United States Patent
Usui

(10) Patent No.: US 6,950,147 B2
(45) Date of Patent: Sep. 27, 2005

(54) APPARATUS AND METHOD FOR DISCRIMINATING COLOR FORMAT

(75) Inventor: Junichi Usui, Fukuroi (JP)

(73) Assignees: Pioneer Corporation, Tokyo-to (KR); Pioneer Display Products Corporation, Shizuoka (JP)

(*) Notice: Subject to any disclaimer, the term of this patent is extended or adjusted under 35 U.S.C. 154(b) by 523 days.

(21) Appl. No.: 10/178,729

(22) Filed: Jun. 25, 2002

(65) Prior Publication Data

US 2003/0001967 A1 Jan. 2, 2003

(30) Foreign Application Priority Data

Jun. 27, 2001 (JP) ............................. P2001-195152

(51) Int. Cl.$^7$ ............................................... H04H 5/46
(52) U.S. Cl. ...................................... 348/557; 348/558
(58) Field of Search .............................. 348/558, 554, 348/526, 557, 604, 555, 180, 643

(56) References Cited

U.S. PATENT DOCUMENTS

| | | | | |
|---|---|---|---|---|
| 3,839,649 A | * | 10/1974 | Morio | 327/42 |
| 5,119,177 A | * | 6/1992 | Lim | 348/557 |
| 5,267,024 A | * | 11/1993 | Murayama | 348/643 |
| 5,432,612 A | * | 7/1995 | Takashimizu et al. | 386/9 |
| 5,570,196 A | * | 10/1996 | Miyaguchi | 386/1 |
| 5,835,157 A | * | 11/1998 | Miyazaki et al. | 348/558 |
| 5,943,101 A | * | 8/1999 | Hirtz et al. | 348/604 |
| 6,172,713 B1 | * | 1/2001 | Morita | 348/557 |
| 6,765,621 B2 | * | 7/2004 | Okada | 348/558 |

* cited by examiner

Primary Examiner—Victor R. Kostak
(74) Attorney, Agent, or Firm—Morgan Lewis & Bockius LLP

(57) ABSTRACT

An apparatus discriminates a color format. The signal processing paths separate a luminance signal and a color signal from a broadcasting signal based on a plurality of color formats. The direct signal path provides a direct output of the broadcasting signal without separating the luminance signal and the color signal therefrom. The relay device selectively relays the broadcasting signal as input to any one of the respective signal processing paths and the direct signal path. The detection device detects color format variation of the broadcasting signal based on an output signal from the signal processing paths. The discrimination device discriminates the color format of the broadcasting signal based on the broadcasting signal as input through the direct signal path. The control device controls the relay device to relay the broadcasting signal to the direct signal path when color format variation is detected by the detection device.

4 Claims, 2 Drawing Sheets

APPARATUS AND METHOD FOR DISCRIMINATING COLOR FORMAT

BACKGROUND OF THE INVENTION

1. Field of the Invention

The present invention relates a method and apparatus for discriminating a color format of a broadcasting signal, and particularly to such a method and apparatus, which permit a rapid discrimination of the color format.

2. Description of the Related Art

There have conventionally been known receiving apparatus such as a television receiver, which is compatible to a broadcasting signal in accordance with a plurality of color formats such as the NTSC format system and the PAL format system. In such a receiving apparatus, it is necessary to discriminate the color format of the broadcasting signal as received and execute the signal processing in accordance with the corresponding color format. In the conventional receiving apparatus, the predetermined color format, for example the NTSC format system has been set as the signal processing mode so that a receiving step is continued without converting the color format into the other format when the normal signal processing can be conducted. When the normal signal processing cannot be conducted, it is discriminated the type of color format with which the broadcasting signal as received has been processed, based on signals after demodulation in accordance with the NTSC format system. The color format of the broadcasting signal is discriminated and a switching operation of the receiving apparatus is carried out to execute the signal processing in accordance with the discrimination results, thus permitting to cope with the plurality of color formats.

In the conventional method, the color format of the broadcasting signal as being received is discriminated on the basis of resultant signals (i.e., color signals), which have been obtained after completion of separation of the luminance signal and the color signal from the broadcasting signal in accordance with the prescribed color format. As a result, much time is required to carry out the discrimination step of the color format, thus making it difficult to conduct a rapid stitching operation corresponding to the color format.

SUMMARY OF THE INVENTION

An object of the present invention is therefore to provide a method and apparatus for discriminating a color format, which permits a rapid discrimination of the color format.

In order to attain the aforementioned object, an apparatus of the first aspect of the present invention comprises:

a plurality of signal processing paths for separating a luminance signal and a color signal form a broadcasting signal based on a plurality of color formats;

a direct signal path for providing a direct output of the broadcasting signal without separating the luminance signal and the color signal therefrom;

a relay device for selectively relaying the broadcasting signal as inputted to any one of the respective signal processing paths and the direct signal path;

a detection device for detecting variation of the color format of the broadcasting signal based on an output signal from the signal processing paths;

a discrimination device for discriminating the color format of the broadcasting signal based on the broadcasting signal as inputted through the direct signal path; and a control device for controlling the relay device so as to relay the broadcasting signal to the direct signal path, when variation of the color format is detected by means of the detection device.

According to the apparatus of the first aspect of the present invention for discriminating the color format, when the variation of the color format is detected, the broadcasting signal is relayed to the direct signal path so that the color format of the broadcasting signal is discriminated in the discrimination device, thus providing a rapid discrimination of the color format in the discrimination device. In the apparatus of the present invention, the term of the "variation of the color format" includes the state in which the color format changes among the plurality of color formats and the other state in which any signal, by which the color format can be defined, has not been inputted.

In the second aspect of the present invention, the control device may control the relay device so as to relay the broadcasting signal to the signal processing path corresponding to the color format discriminated by means of the discrimination device.

According to such a feature of the second aspect of the present invention, it is possible to make a rapid selection of the signal processing path in an appropriate manner on the basis of the rapid discrimination in the discrimination device.

In the third aspect of the present invention, the plurality of signal processing paths may include signal processing paths, which correspond to NTSC format system and PAL format system.

In order to attain the aforementioned object, a method of the fourth aspect of the present invention comprises the steps of:

a detection step for detecting, based on an output signal from any one of a plurality of signal processing paths, which separate a luminance signal and a color signal from a broadcasting signal based on a plurality of color formats, variation of the color format of the broadcasting signal; and a discrimination step for discriminating the color format of the broadcasting signal based on the broadcasting signal prior to demodulation thereof.

According to such features of the fourth aspect of the present invention, when the variation of the color format is detected, the color format of the broadcasting signal is discriminated based on the broadcasting signal prior to the demodulation thereof. It is therefore possible to make a rapid discrimination of the color format. In the method of the present invention, the term of the "variation of the color format" includes the state in which the color format changes among the plurality of color formats and the other state in which any signal, by which the color format can be defined, has not been inputted.

In the fifth aspect of the present invention, the method may further comprise an output step for outputting the broadcasting signal through the signal processing path corresponding to the color format, which is discriminated in the discrimination step.

According to such a feature of the fifth aspect of the present invention, it is possible to make a rapid selection of the signal processing path in an appropriate manner on the basis of the rapid discrimination of the color format.

In the sixth aspect of the present invention, the plurality of signal processing paths may include signal processing paths, which correspond to NTSC format system and PAL format system.

DETAILED DESCRIPTION OF THE PREFERRED EMBODIMENTS

Now, an embodiment of an apparatus of the present invention for discriminating a color format will be described in detail below with reference to FIGS. 1 and 2. The apparatus of the embodiment of the present invention for discriminating the color format is provided in a receiving apparatus in which a plasma display panel is used as a display panel. However, the present invention is not limited only to display utilizing the plasma display panel and to application to the receiving apparatus.

Figure 1:
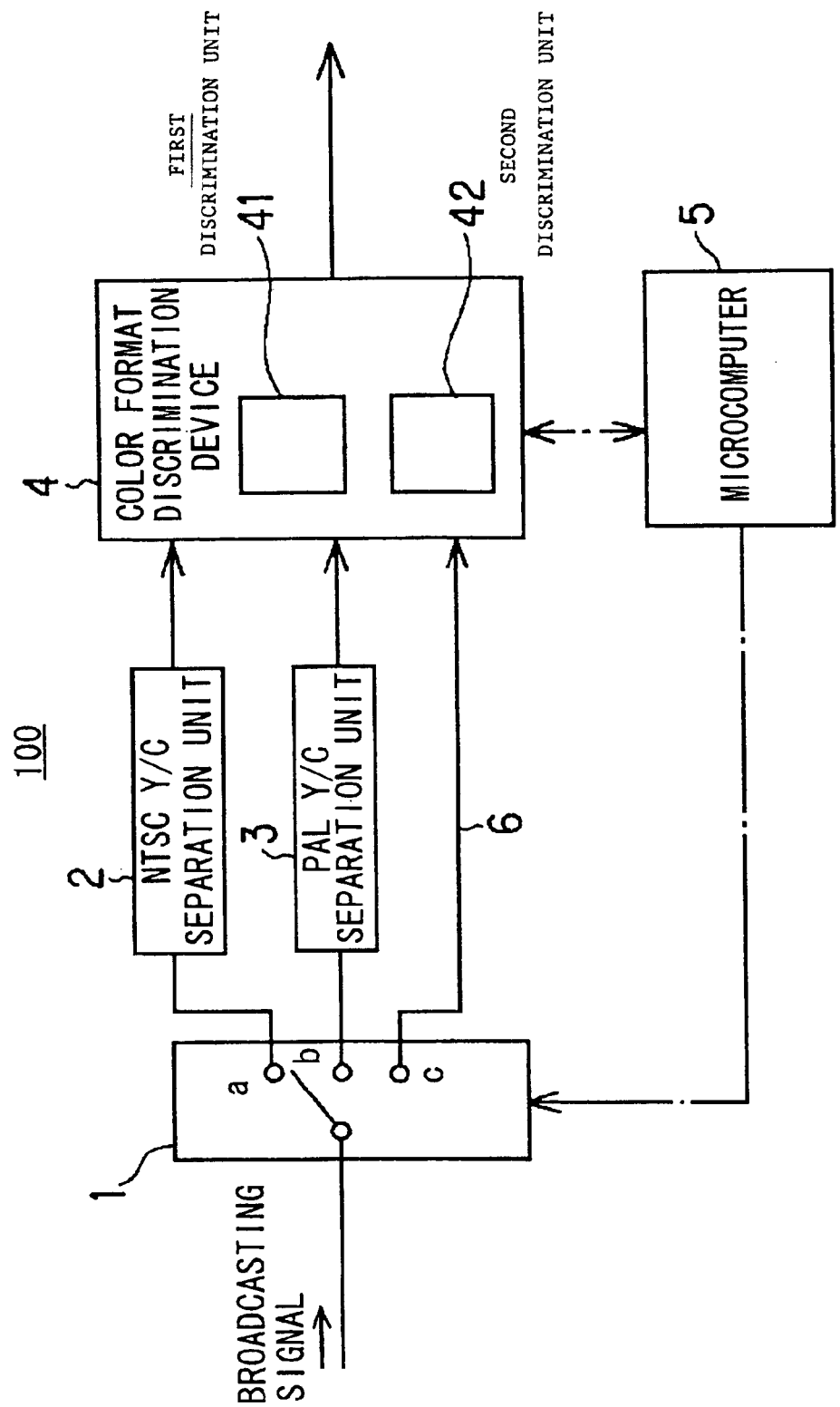
FIG. 1 is a block diagram illustrating an apparatus of the embodiment of the present invention for discriminating a color format.
Figure 2:
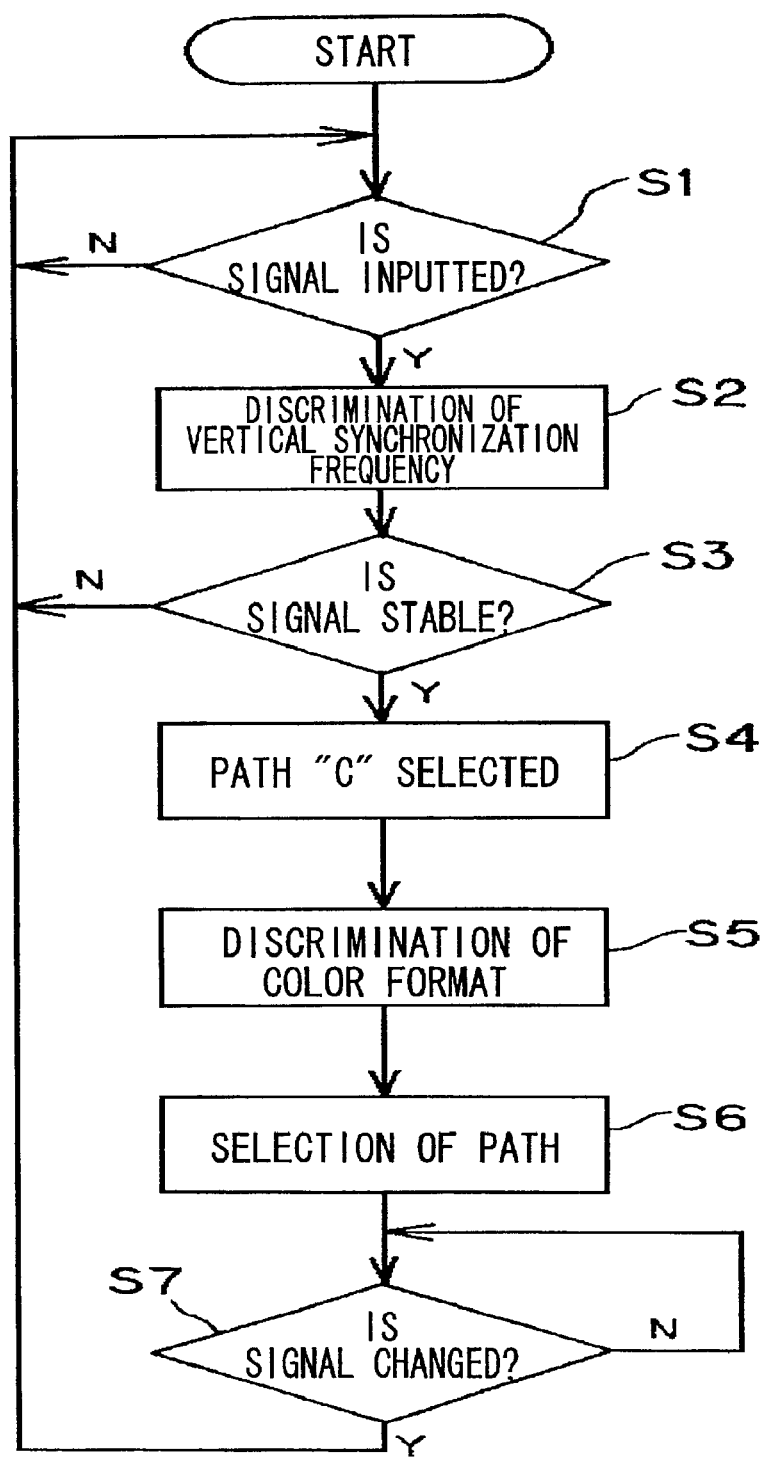
FIG. 2 is a flowchart illustrating operation of the apparatus of the embodiment of the present invention for discriminating the color format.

FIG. 1 is a block diagram illustrating an apparatus of the embodiment of the present invention for discriminating a color format, and FIG. 2 is a flowchart illustrating operation of the apparatus of the embodiment of the present invention for discriminating the color format.

As shown in FIG. 1, the color format discriminating apparatus 100 of the embodiment of the present invention comprises a switch 1 for switching the paths for a broadcasting signal as received, an NTSCY/C separation unit 2 for separating the luminance signal and the color signal from the broadcasting signal in accordance with the NTSC format system, a PALY/C separation unit 3 for separating the luminance signal and the color signal from the broadcasting signal in accordance with the PAL format system, a color format discrimination device 4 for discriminating the color format of the broadcasting signal and a microcomputer 5 for controlling the respective units of the color format discriminating apparatus 100.

As shown in FIG. 1, the switch 1, which is controlled by means of the microcomputer 5, has a contact "a" connected to a path for relaying the broadcasting signal to the NTSCY/C separation unit 2, a contact "b" connected to a path for relaying the broadcasting signal to the PALY/C separation unit 3 and a contact "c" connected to a direct signal path 6, which is directly connected to the color format discrimination device 4. The output signal (i.e., the color signal) from the NTSCY/C separation unit 2 or the PALY/C separation unit 3 is inputted to the color format discrimination device 4. The switch 1 may be an electronic switch having no mechanical structure.

The color format discrimination device 4 is provided with the first discrimination unit 41 and the second discrimination unit 42. The first discrimination unit 41 discriminates as whether or not the broadcasting signal has been received and the signal inputted to the color format discrimination device 4 is stable. The second discrimination unit 42 discriminates the color format as inputted to the color format discrimination device 4. The microcomputer 5 controls the color format discrimination device 4. The discrimination results from the first discrimination unit 41 and the second discrimination unit 42 of the color format discrimination unit 41 are sent to the microcomputer 5.

Now, description will be given below of operation of the color format discriminating apparatus 100 of the embodiment of the present invention with reference to FIG. 2.

The microcomputer 5 executes the processing as shown in FIG. 2. A switching-on operation of the receiving apparatus, which is provide with the color format discriminating apparatus 100 of the embodiment of the present invention, for example causes the processing to start.

When the processing starts, it is judged as whether or not the broadcasting signal has been received in Step S1. An affirmative judgment in Step S1 causes the system to enter Step S2. A negative judgment in Step S1 causes Step S1 to be repeated. The switch 1 is kept in a state a switching element is connected to the contact "a" or the contact "b" in Step S1 so that the output signal from the NTSCY/C separation unit 2 or the PALY/C separation unit 3 can be inputted to the color format discrimination device 4. It is judged in Step S1 as whether or not the broadcasting signal has been received, on the basis of the discrimination results from the first discrimination unit 41, which receives the output signal from the NTSCY/C separation unit 2 or the PALY/C separation unit 3. Here, judgment as whether or not the broadcasting signal has been received is made for example on the basis of existence of a synchronization signal in the output signal from the NTSCY/C separation unit 2 or the PALY/C separation unit 3.

Then, in Step S2, there is discriminated a frequency of a vertical synchronization signal, which is included in the signal that has been outputted from the NTSCY/C separation unit 2 or the PALY/C separation unit 3 and then inputted to the color format discrimination device 4. Here, it is possible to make a provisional discrimination of the color format of the broadcasting signal as being received, on the basis of the vertical synchronization signal. For example, the frequency of the vertical synchronization signal of 50 Hz causes the color format to be provisionally discriminated as the PAL format system and the frequency thereof of 60 Hz causes the color format to be provisionally discriminated as the NTSC format system. Such discrimination results may provide the color format discrimination apparatus 100 with operational effects. If the frequency of the vertical synchronization signal is 50 Hz, it is possible to prevent discrimination error relative to the signal having the different frequency of 60 Hz, by increasing the detection sensitivity in the PAL format system.

In Step S3, it is judged as whether or not the broadcasting signal has been received stably. More specifically, it is judged as whether or not the broadcasting signal has been received stably, on the basis of discrimination results from the first discrimination unit 41, which receives the output signal from the NTSCY/C separation unit 2 or the PALY/C separation unit 3. Judgment in Step S3 corresponds to judgment as whether or not demodulation adapted to the color format of the broadcasting signal as being received can be executed in an appropriate manner. More specifically, in Step S3, it is judged that the demodulation adapted to the actual color format of the broadcasting signal cannot be executed, when the broadcasting signal has not been received stably. Judgment on whether or not the broadcasting signal has been received stably can be made on the basis of whether or not a Y/C separation of the signal has been performed stably in accordance with a prescribed clock (e.g., the synchronization signal) in the NTSCY/C separation unit 2 or the PALY/C separation unit 3, or whether or not the detection results of the color system have been stable in a prescribed period of time.

A negative judgment in Step S3 causes the system to return to Step S1. In this case, the Y/C separation continues in the NTSCY/C separation unit 2 or the PALY/C separation unit 3, which is currently selected. An affirmative judgment in Step S3 causes the system to enter Step S4 so that the switching element in the switch 1 is switched to the contact "c". As a result, the broadcasting signal is directly inputted to the color format discrimination device 4 through the direct signal path 6.

Then, in Step S5, the color format is discriminated on the basis of the broadcasting signal, which is directly inputted to the color format discrimination device 4 through the direct signal path 6. Here, the color format is discriminated on the basis of the discrimination results obtained by the second discrimination unit 42 of the color format discrimination device 4.

More specifically, such discrimination is made on the basis of the frequency of the vertical synchronization signal (i.e., 60 Hz/50 Hz), the frequency of the color sub-area and phase of color burst.

Judgment criteria for the discrimination results may be changed when turning on power, switching the inputting operation, switching external signals or switching an automatic discrimination mode. It is possible to increase, for example, the monitoring period of time for the discrimination results when turning on power, to prevent discrimination error before supply voltage becomes stable.

Then, in Step S6, the switching operation of the switch 1 is carried out in accordance with the discrimination results in Step S5. In case where the color format is discriminated for example as the NTSC format system in Step S5, the switching operation of the switch 1 is carried out to switch the path of the broadcasting signal to the side (i.e., the contact "a") of the NTSCY/C separation unit 2. In case where the color format is discriminated for example as the PAL format system in Step S5, the switching operation of the switch 1 is carried out to switch the path of the broadcasting signal to the side (i.e., the contact "b") of the PALY/C separation unit 3. As a result, there is selected the Y/C separation unit, which is adapted to the discrimination results in Step S5 so as to carry out a demodulation step of the broadcasting signal in the color format discriminated in Step S5.

Then, in Step S7, it is judged as whether or not the color format of the broadcasting signal as being received changes, on the signal inputted to the color format discrimination device 4. Here, there are made the similar judgments to the judgment in Step S1 and the judgment in Step S3. More specifically, in case where it is judged in the first discrimination unit 41 that the broadcasting signal has not been received, and in case where it is judged in the first discrimination unit 41 that the broadcasting signal has not been received stably, there is made a judgment that the color format has changed. When there is a state other than the above-mentioned states, there is made a judgment that the color format has not changed. Judgment on whether or not the broadcasting signal has been received stably can be made on the basis of whether or not a Y/C separation of the signal has been performed stably in accordance with a prescribed clock (e.g., the synchronization signal) in the NTSCY/C separation unit 2 or the PALY/C separation unit 3, or whether or not the detection results of the color system have been stable in a prescribed period of time in the same manner as Step S3.

A negative judgment in Step S7 causes Step S7 to be repeated as shown in FIG. 2. Selection of the same path by means of the switch is maintained during repetition of Step S7, so as to carry out a demodulation step in accordance with the same color format. An affirmative judgment in Step S7 causes the system to return to Step S1 so as to judge as whether or not the broadcasting signal has been received. Then, the above-mentioned processing steps are repeated.

In the color format discrimination apparatus 100 of the embodiment of the present invention, in case where there is made a judgment (i.e., the affirmative judgment in Step S3) that there has not been carried out a demodulation step adapted to the color format of the broadcasting signal as being received, the luminance signal and the color signal, which are obtained through the Y/C separation, are not inputted to the color format discrimination device 4, but the broadcasting signal is directly inputted to the color format discrimination device 4 (Step S4) so as to discriminate the color format of the broadcasting signal as being received, in the second discrimination unit 42 (Step S5). It is therefore possible to discriminate rapidly the color format in Step S5 so as to make a rapid selection of a suitable signal processing path in Step S6. As a result, application of the color format discriminating apparatus of the present invention makes it possible to switch rapidly the display mode in an appropriate manner for example in the receiving apparatus, without displaying obstructive images when switching the color format.

According to the color format discriminating apparatus of the present invention as described in detail, in case where change in the color format is detected, the broadcasting signal is relayed to the direct signal path so as to discriminate the color format of the broadcasting signal in the discrimination device. It is therefore possible to discriminate rapidly the color format in the discrimination device.

The entire disclosure of Japanese Patent Application No. 2001-195152 filed on Jun. 27, 2001 including the specification, claims, drawings and summary is incorporated herein by reference in its entirety.

What is claimed is:

1. An apparatus for discriminating a color format comprising:

a plurality of signal processing paths for separating a luminance signal and a color signal from a broadcasting signal based on a plurality of color formats;

a direct signal path for providing a direct output of the broadcasting signal without separating the luminance signal and the color signal therefrom;

a relay device for selectively relaying the broadcasting signal as inputted to any one of the respective signal processing paths and the direct signal path;

a detection device for detecting variation of the color format of the broadcasting signal based on an output signal from the signal processing paths;

a discrimination device for discriminating the color format of the broadcasting signal based on the broadcasting signal as inputted through the direct signal path; and a control device for controlling the relay device so as to relay the broadcasting signal to the direct signal path, when variation of the color format is detected by means of the detection device.

2. The apparatus as claimed in claim 1, wherein;

the control device controls the relay device so as to relay the broadcasting signal to the signal processing path corresponding to the color format discriminated by means of the discrimination device.

3. The apparatus as claimed in claim 1, wherein:

the plurality of signal processing paths includes signal processing paths, which correspond to NTSC format system and PAL format system.

4. The apparatus as claimed in claim 2, wherein:

the plurality of signal processing paths includes signal processing paths, which correspond to NTSC format system and PAL format system.

* * * * *